United States Patent
Anvari

(10) Patent No.: US 9,076,325 B1
(45) Date of Patent: Jul. 7, 2015

(54) WIRELESS SENSOR WITH DIGITAL DETECTOR

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 211 days.

(21) Appl. No.: 13/815,347

(22) Filed: May 13, 2013

(51) Int. Cl.
  *G08B 23/00* (2006.01)
  *G08C 17/02* (2006.01)
  *H04Q 9/00* (2006.01)

(52) U.S. Cl.
  CPC . *G08C 17/02* (2013.01); *H04Q 9/00* (2013.01)

(58) Field of Classification Search
  USPC ........ 340/870.02, 10.1, 10.2, 10.3, 10.4, 10.5
  See application file for complete search history.

(56) References Cited

U.S. PATENT DOCUMENTS

| | | | | |
|---|---|---|---|---|
| 4,437,066 A | * | 3/1984 | Gordon | 327/106 |
| 5,101,416 A | * | 3/1992 | Fenton et al. | 375/150 |
| 5,937,016 A | * | 8/1999 | Choi | 375/341 |
| 5,960,028 A | * | 9/1999 | Okamoto et al. | 375/130 |
| 6,078,281 A | * | 6/2000 | Milkovich et al. | 342/196 |
| 7,227,834 B1 | * | 6/2007 | Barton et al. | 370/208 |
| 8,552,835 B2 | * | 10/2013 | Sadr | 340/10.1 |
| 2005/0093591 A1 | * | 5/2005 | Rhee et al. | 327/156 |
| 2005/0136856 A1 | * | 6/2005 | Goldberg | 455/101 |
| 2005/0238126 A1 | * | 10/2005 | Ribo et al. | 375/355 |
| 2009/0251363 A1 | * | 10/2009 | Zohar et al. | 342/357.1 |
| 2012/0146834 A1 | * | 6/2012 | Karr | 342/47 |
| 2014/0269449 A1 | * | 9/2014 | Abramsky et al. | 370/278 |

* cited by examiner

*Primary Examiner* — Jennifer Mehmood
*Assistant Examiner* — Rufus Point

(57) ABSTRACT

A wireless sensor with digital detector for monitoring the environment surrounding the sensor. The wireless sensor with digital detector comprises a configurable wireless transceiver with quadrature down and up converters, memory to store the real time received in phase and quadrature phase samples, a bank of phase rotators to phase rotate the received stored samples and a bank of in phase and quadrature phase constellation level slicers to detect the received bits. A control processor utilizes the received information, received signal strength and timing information to estimate and calculate various environmental parameters which can be used to activate different devices.

4 Claims, 10 Drawing Sheets

WIRELESS SENSOR WITH DIGITAL DETECTOR

BACKGROUND

In the recent past, wireless sensors have found their way into a wide variety of applications and systems with vastly varying requirements and characteristics. Wireless sensors offer a powerful combination of distributed sensing, computing and communication. They lend themselves to countless applications and, at the same time, offer numerous challenges due to their peculiarities, primarily the stringent energy constraints to which wireless sensors are typically subjected. The distinguishing traits of wireless sensors have a direct impact on the hardware and algorithm design at four levels: power source, hardware, accuracy of detection, and speed of protection.

Automatic detection and prevention of certain accidents is but one of many potential applications of wireless sensors. Wireless sensors have captured the attention and imagination of many researchers, encompassing a broad spectrum of the ideas. Despite their variety, all wireless sensors have certain fundamental features in common. Perhaps most essential is that they are embedded in the real world. Wireless sensors detect the world's physical nature, such as surrounding objects, their proximity, their distance and speed. Similarly, actuators affect the world in some way, such as activating a device, making a noise, or exerting a force. Such a close relationship with physical world is a dramatic contrast to much of traditional computing, which often exist in virtual world.

Smart environments represent the next evolutionary development step in building, utilities, industrial, home, shipboard, and transportation systems automation. Like any sentient organism, the smart environment relies first and foremost on sensory data from the real world. Sensory data comes from multiple sensors of different modalities in distributed locations. The smart environment needs information about its surroundings as well as about its internal workings.

Wireless sensors are standard measurement tools equipped with transceiver to convert signals from a control processor into a radio transmission and then receive the reflected signal by a receiver which then detects the received signal and sends it to a processor to be analyzed. There are a number of items to consider when selecting a wireless measurement instrument.

Type of Measurement:

It is important to understand what is being measured. Wireless transceivers sensor (which incorporate wireless process measurement and control) typically have a unique function. Sensors are specifically designed for speed, distance, flow, etc., and must be selected accordingly.

Accuracy and Response Time:

How accurate does the measurement need to be, and how quickly should the measurement be updated? Most wireless sensors are as accurate as their wired counterparts; however a signal is typically transmitted frequent enough to allow for accurate measurement while preserving battery power.

Range:

The range of wireless sensors varies widely. Some are designed for short-range of a few feet, while other sensors can cover few hundred feet. Regardless of the sensors capability, the range of a wireless signal is always limited by signal bandwidth, and frequency of operation. For certain applications very high operating frequency has to be used which limit the operation range.

Frequency:

The frequency of radio transmission is also important to consider. Laws vary by country and region as to which parts of the wireless spectrum are available for use without specific licenses. Accuracy and response time in certain application depends on operating frequency, the higher the frequency the more accurate the measurement of certain parameters.

Various components of a wireless sensor system are;

Transmitters:

In certain applications the transmitters use particular signals to send via radio waves to a receiver.

Receiver:

receives and interpret the wireless data. The receiver 'reads' a radio signal, utilize it to estimate and calculate certain parameters, and then send them to a controller to make decision.

Controller:

receives and analyze data from wireless receiver. However, the wireless controller is also able to manipulate a process based on the data being measured.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
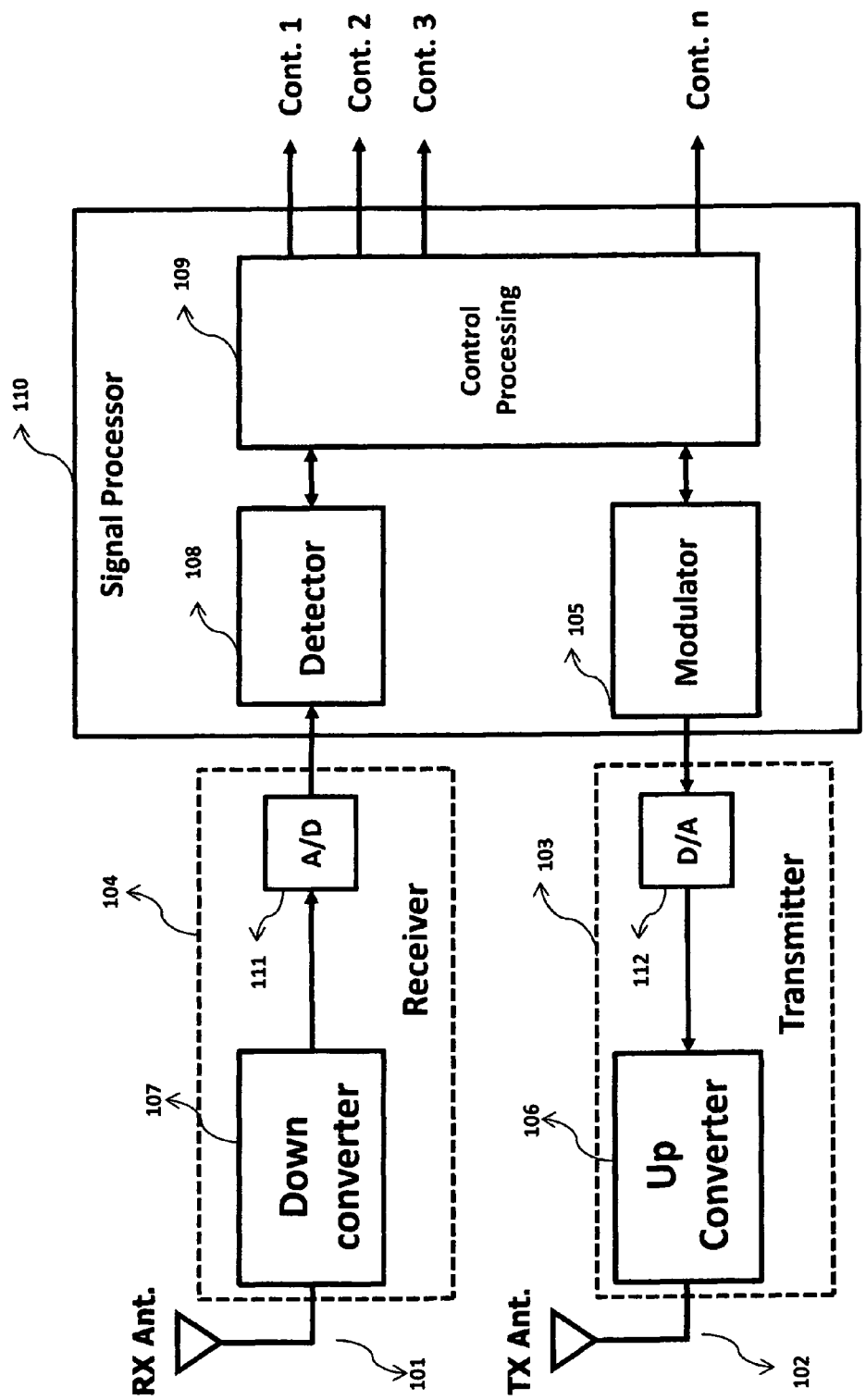
FIG. 1 illustrates an embodiment of a wireless sensing system.

FIG. 1 depicts an embodiment of wireless sensor system 100. In general, wireless sensor system 100 facilitates estimation and calculation of certain parameters by transmitting a coded signal generated by a control processor 109 through a modulator 105, a transmitter 103 and antenna 102 and then receiving the attenuated version of the same coded signal by an antenna 101, receiver 104 and detector 108. For example, control processor 109 creates a random transmit pattern, send it to modulator 105 for modulation then the modulated signal is sent to transmitter 103 to be converted to analog signal by digital-to-analog (D/A) converter 112 and up converted to carrier frequency by up convertor 106 for transmission through antenna 102. Then the reflected transmit signal from an object in the environment is received by antenna 101 and receiver 104, where it is down converted by down convertor 107 and converted to digital signal by analog-to-digital (A/D) converter 111. The digitized received signal is processed in signal processing unit 110, where it is detected by detector 108 and processed by control processor 109. The down converted digitized received signal also facilitates measurement of received signal strength to provide to control processor 109.

Wireless sensor system 100 includes, among other things, signal processor 110, transmitter 103, transmit antenna 102, receive antenna 101, and receiver 104.

In one embodiment, signal processor 110, transmit antenna 102, transmitter 103, receive antenna 101, and receiver 104 are components of wireless sensor system 100 that could be used for various applications. For example, it can be used in robotics, automated automobiles, helmets, and etc.

In one embodiment, signal processor 110 that processes both transmit and receive signal comprises of control processor 109, modulator 105, and detector 108.

Signal processor 110 is for processing information transmitted from transmitter 103 through antenna 102 and information received from receiver 104 through receive antenna 101. Signal processor 110 typically utilizes appropriate hardware and software algorithm to properly process the information.

Wireless sensor system 100 can be any wireless transceiver that is able to wirelessly transmit communication signals, such as short coded pattern. Wireless sensor system 100 is disposed on any physical platform that is conductive to effectively transmit the signals.

In one embodiment, transmit pattern through wireless system 100 are selected by signal processor 110.

In one embodiment, communications through wireless system 100 are by a transmit antenna 102 and a received antenna 101. Transmit and receive antennas are physically separated to provide sufficient isolation between transmit and receive antennas.

In one embodiment, communications through wireless system 100 are transmitted by a transmit antenna 102.

In one embodiment, communications through wireless system 100 are received by a receive antenna 101.

In one embodiment, communications through wireless system 100 are transmitted and received by a single antenna. In general at any specified period of time the antenna is selected by a switch and/or a circulator.

Signal Processor 110 has a variety of functions. In general, signal processor 110 is utilized for signal processing, calculation, estimation, activities, methods, procedures, and tools that pertain to the operation, administration, maintenance, and provisioning of wireless sensor. In one embodiment, signal processor 110 includes a database that is used for various applications. The database can be utilized for analyzing statistics in real-time.

Signal processor 110 also has a variety of thresholds. In general, signal processor 110 provides controls to various components that are connected to it. Moreover, signal processor 110 is a high capacity communication facility that connects primary nodes.

In one embodiment the wireless sensor system 100 is a transceiver that periodically switches between transmission and reception. During transmission a signal is transmitted and during the reception period the reflected signals from the surrounding environment objects are received. The received signal by receiver 104 is then digitized and sent to signal processor 110 for further processing.

In one embodiment the wireless sensors 100 are microwave, or mili-metric wave transceivers.

In one embodiment wireless sensor system 100 is controlled by control processor 109. The control processor 109 controls transmit pulse width and number of times a pulse is transmitted by wireless sensor system 100. Control processor 109 also coordinates the transmit time and receive time period for the wireless sensors 100.

Figure 2:
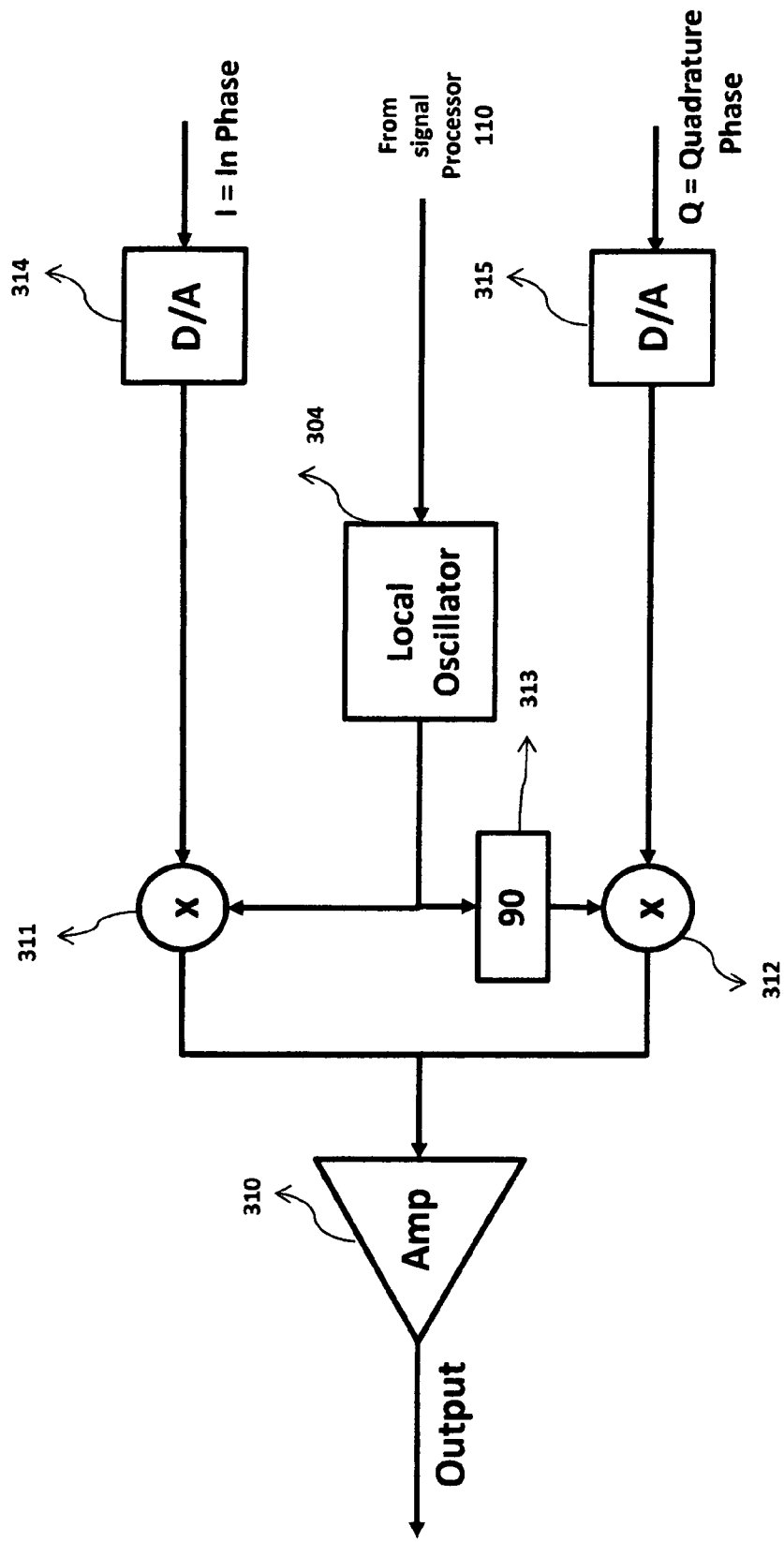
FIG. 2 illustrate embodiments of a wireless sensor transmitter.

FIG. 2 depicts an embodiment of wireless sensor transmitter 103 comprising of digital-to-analog (D/A) converters 314 and 315, quadrature mixers 311 and 312, local oscillator 304, 90 degree phase shifter 313, and an amplifier 310. In one embodiment, the transmitter 103 can be configured to up-convert the transmit signal to different carrier frequencies. In particular, the local oscillator 304 can be configured through signal processor 110 to different frequencies.

In one embodiment, the output of transmit modulator 105 is converted to analog in phase "I" and quadrature phase "Q" signals to be up converted. The "I" and "Q" signals are up converted to carrier frequency in mixers 311 and 312 by mixing the "I" and "Q" signals with local oscillator signal and 90 degree phase shifted local oscillator signal.

In one embodiment, the up converted signal is amplified by an amplifier 111 before being transmitted.

Figure 3:
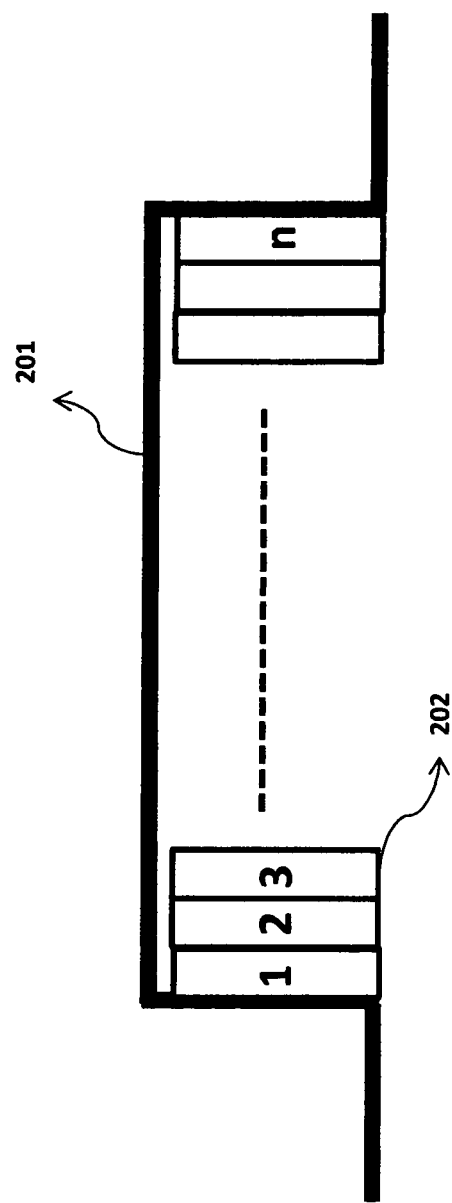
FIG. 3 illustrates embodiment s of transmitter pattern for wireless sensor.

FIG. 3 depicts an embodiment of transmitter pattern. The transmit pattern has a durations 201 and a pattern 202.

In one embodiment, the duration 201 defines the accuracy of measurement of environment parameters.

In one embodiment, the size of the pattern 202 defines the accuracy of the receiver detection.

Figure 4:
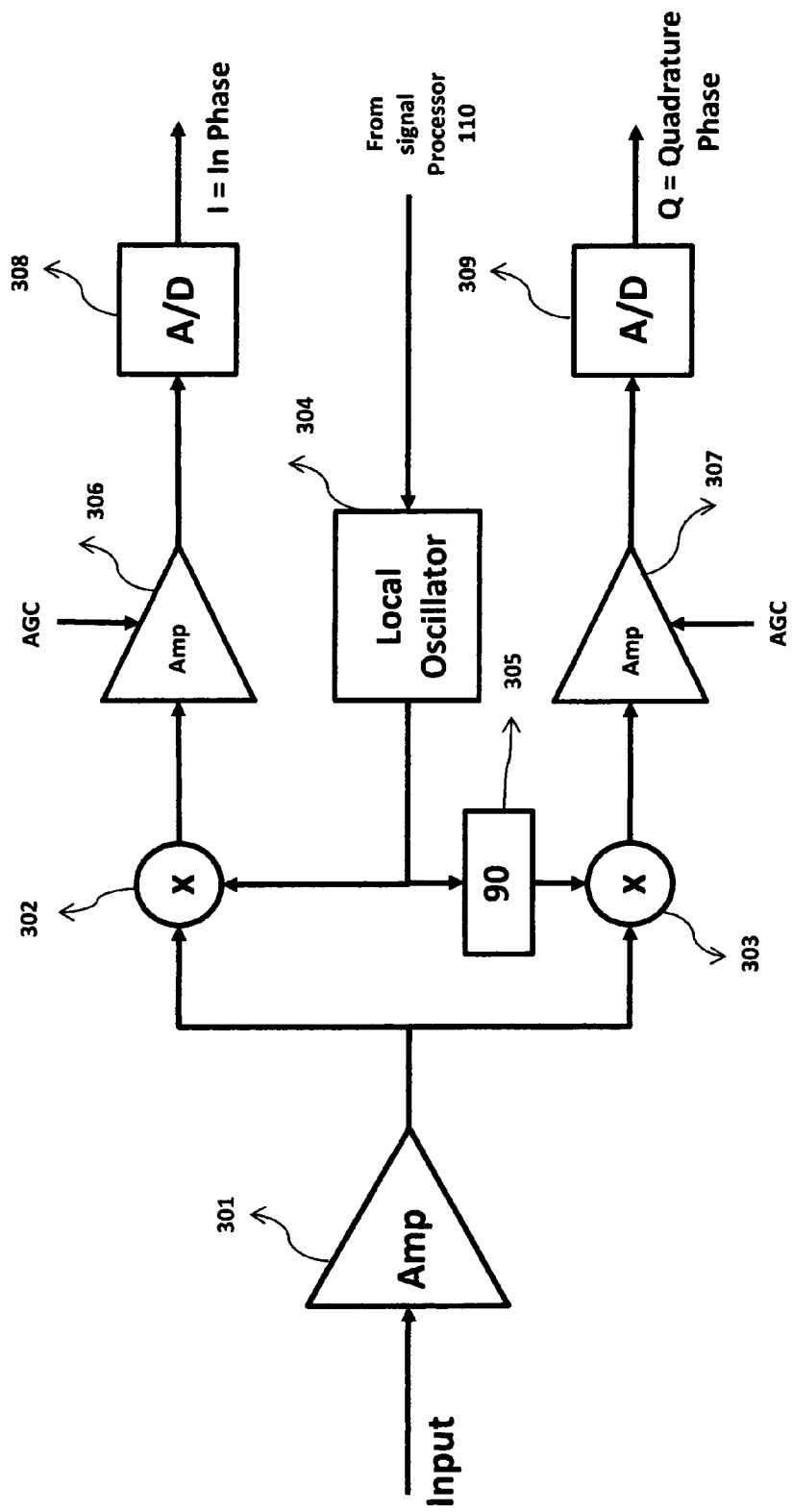
FIG. 4 illustrates embodiment of a receiver down convertor.

FIG. 4 depicts an embodiment of receiver 104. In general, receiver 104 facilitates in down converting the received signal to baseband in phase "I" and quadrature phase "Q" signals, and analog-to-digital conversion of "I" and "Q" signals for detection. The receiver 103 comprises of an amplifier 301, mixers 302 and 303, 90 degree phase shifter 305, local oscillator 304, automatic gain control (AGC) amplifiers 306 and 307, and analog-to-digital (A/D) converters 308 and 309. During the receive time the signal from antenna 101 is mixed with a local oscillator at the receive frequency to down convert the received signal to baseband "I" and "Q" signals.

In one embodiment, the received signal from receive antenna 101 is amplified by amplifier 301. The signal is amplified before being divided and applied to the down converter mixers 302 and 303.

In one embodiment, the divided received signal and in phase and quadrature phase local oscillator 304 are mixed in mixers 302 and 303 to produce baseband output "I" and "Q" signals.

In one embodiment, the local oscillator 304 is 90 degree phase shifted by phase shifters 305.

In one embodiment, the down converter 107 is a complex one with quadrature mixers 302 and 303 and phase shifters 305.

In one embodiment, the "I" and "Q" signals are amplified by AGC amplifiers 306 and 307. The gain of the AGC amplifiers 306 and 307 can be adjusted by signal processor 110.

In one embodiment, the "I" and "Q" signals are converted to digital signals by A/Ds 308 and 309 to be processed for signal detection by signal processor 110.

In one embodiment, the local oscillator 304 through signal processor 110 can be configured to operate at different frequency for down conversion of received signal to baseband "I" and "Q" signals.

Figure 5:
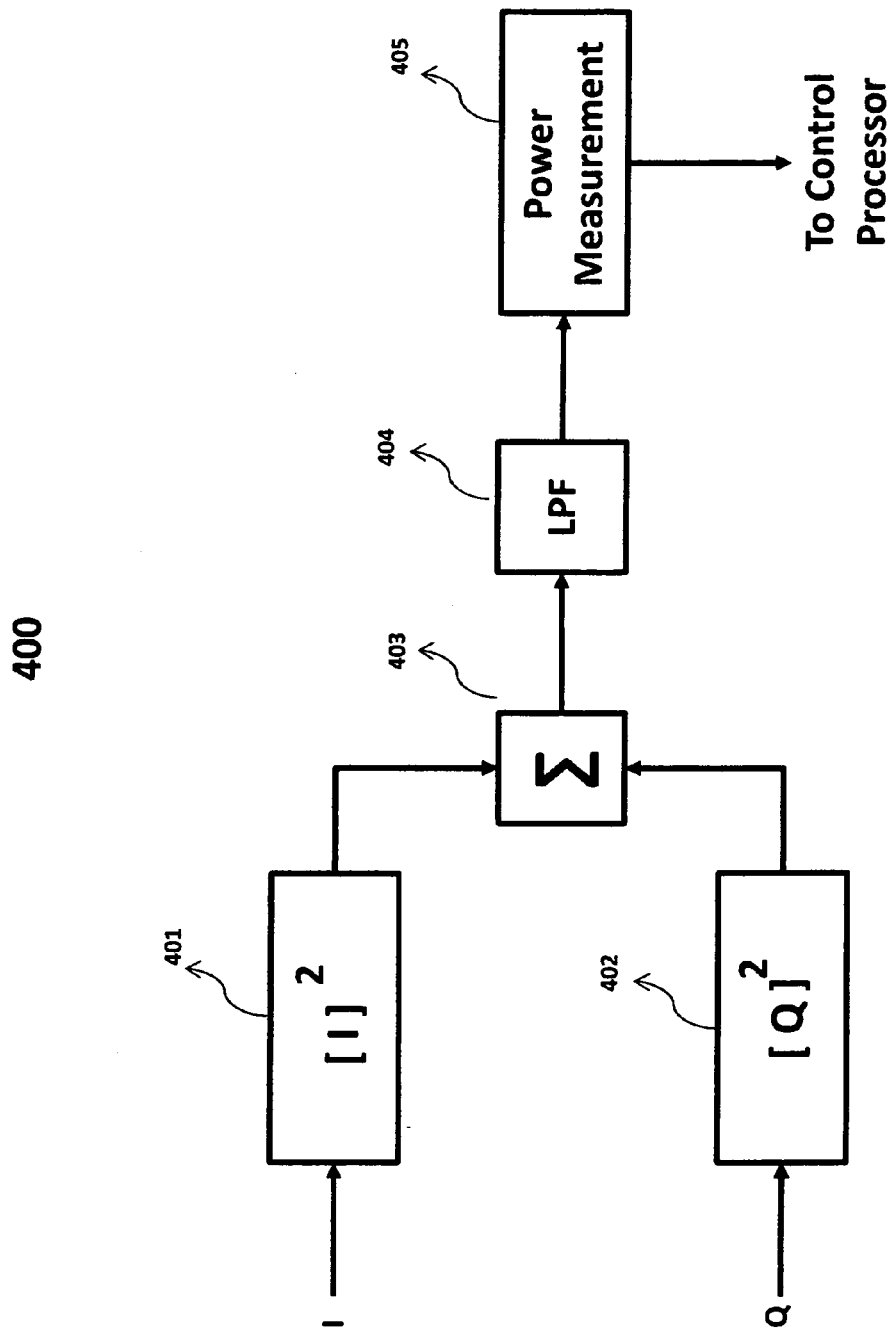
FIG. 5 illustrates embodiment of a receiver signal strength measurement.

FIG. 5 depicts an embodiment of receiver signal strength measurement 400. In general, receiver signal strength measurement 400 facilitates in identifying wanted signal from unwanted signal. The receiver signal measurement 400 comprises of squaring function 401 and 402, summation function 403, low pass filter 404 and power measurement function 405.

In one embodiment, the two input of the signal strength measurement 400 are 90 degree out of phase "I" and "Q" signals. The two inputs of signal strength measurement 400 are the output of the down convertor 107.

Figure 6:
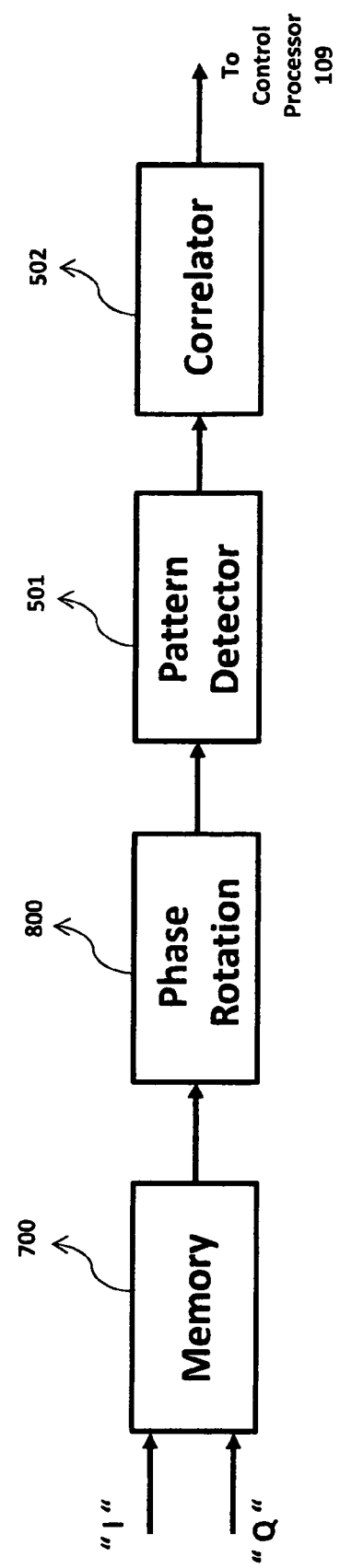
FIG. 6 illustrates embodiment of a receiver detector.

In one embodiment, the two inputs of signal strength measurement 400 are squared by square functions 401 and 402. The squared signals are summed by summation function 403, and then averaged by low pass filter 404. The output of low pass filter 404 is used by power measurement function 405 to estimate and calculate the instantaneous power of receive signal. The power measurement 405 then sends the signal strength information to control processor 109:

FIG. 6 depicts an embodiment of receiver detector 108. In general, detector 108 facilitates in detecting transmit pattern. The detector 108 comprises of a memory 700 to store "I" and "Q" samples, a bank of phase rotators 800, a bank of pattern bit detectors 501, and a bank of correlators 502 with a peak detector.

In one embodiment, the memory 700 stores "I" and "Q" signals for a period of time defined by control processor 109. The storage time is configurable.

In one embodiment, the bank of phase rotator 800 represents received constellation rotation by n×θ. The value of angle θ depends on modulation level and the required accuracy of detection. "n" is an integer.

In one embodiment, the pattern detector 501 is an array of constellation level slicers to detect multi-level modulation signals.

In one embodiment, a bank of correlators 502 compares output of each pattern detectors 501 with the transmit pattern to find a match. When a match is detected from one or more of the pattern detectors a peak is identified.

Figure 7:
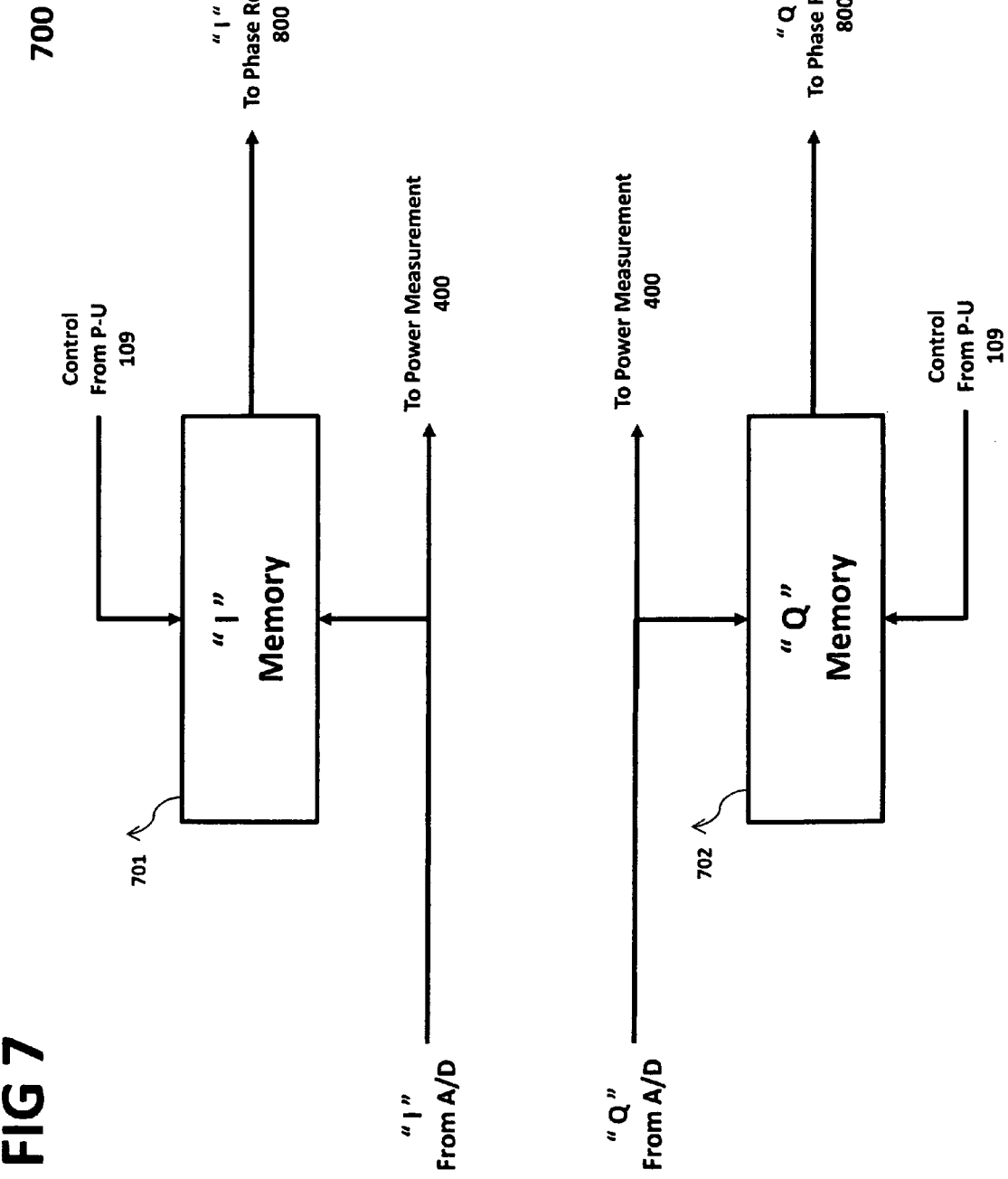
FIG. 7 Illustrates embodiment of receiver memory to store receive signal.

FIG. 7 shows an embodiment of memory 700 used in detector 108. In general, memory 700 facilitates storage of received "I" and "Q" samples for a period of time which is configured by control processor 109. Memory 700 comprises of memory 701 for storing received "I" samples and memory 702 for storing received "Q" samples. The start time and stop time of storing "I" samples in memory 701 and "Q" samples in memory 702 is initiated by control processor 109.

Figure 8:
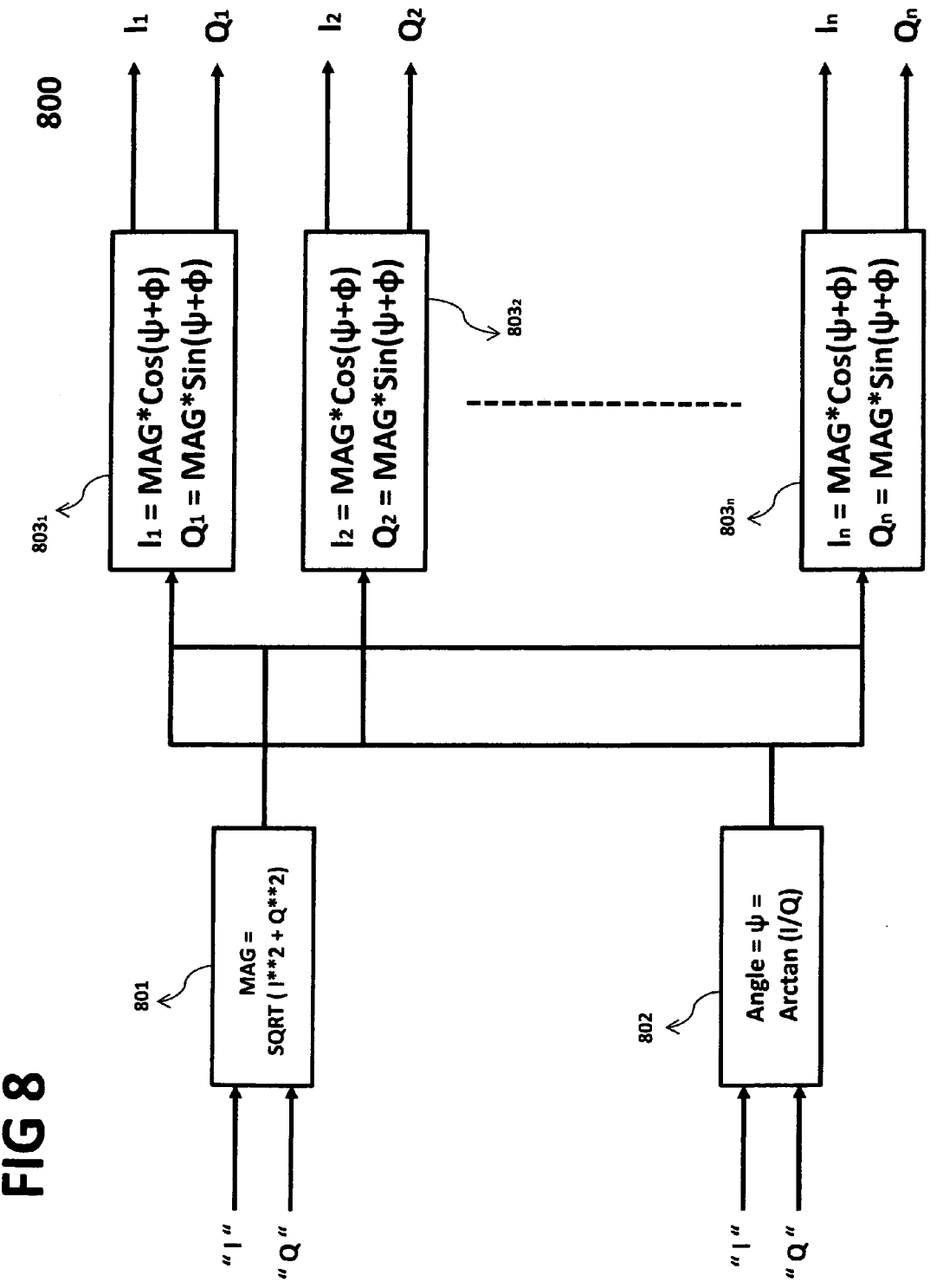
FIG. 8 Illustrates embodiment of receiver signal phase rotator

FIG. 8 depicts an embodiment of received signal rotation 800 used in detector 108. Signal rotation 800 facilitates rotation of input "I" and "Q" samples by a defined phase. Signal rotation 800 comprises of magnitude calculator 801, angle calculator 802 and a bank of phase rotation functions $803_1$ to $803_n$.

In one embodiment, the magnitude calculator 801 calculates the magnitude of the received signal represented by it's "I" and "Q" components. The magnitude is calculated for each signal sample. Magnitude calculation 801 is performed after storage of the "I" and "Q" samples are stopped. This function is not real time.

In one embodiment, the angle calculator 801 calculates the angle of the received signal represented by it's "I" and "Q" components. The angle is calculated for each signal sample. Angle calculation 801 is performed after storage of the "I" and "Q" samples are stopped. This function is not real time.

In one embodiment, the received signal magnitude and angle is used to calculate a phase rotated received signal by phase rotation functions $803_1$ to $803_n$. The phase rotation functions $803_1$ to $803_n$ produce phase rotated received signals by n.θ (n is an integer). The new phase rotated received signals are represented by "$I_1$" and "$Q_1$" to "$I_n$" and "$Q_n$". The phase rotated received signals from phase rotation functions $803_1$ to $803_n$ are then used for bit pattern detection.

Figure 9:
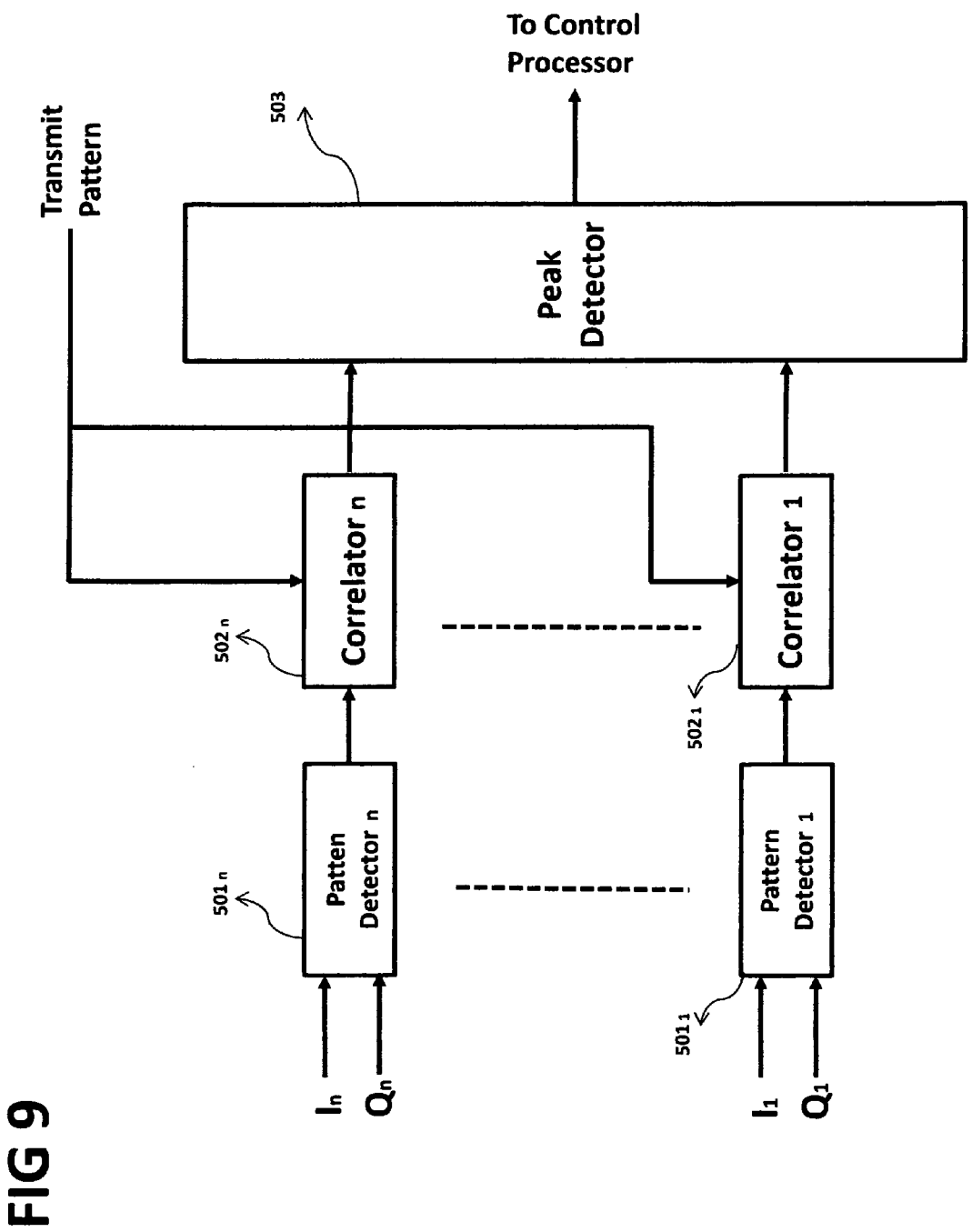
FIG. 9 Illustrates embodiment of receiver pattern detector and correlator

FIG. 9 depicts an embodiment of receiver pattern generator and correlator. In general, pattern generator and correlator facilitate in detecting transmit pattern. It comprises of a bank of pattern detectors $501_1$ to $501_n$, a bank of correlators $502_1$ to $502_n$, and a peak detector 503.

In one embodiment the bank of patterns detectors $501_1$ to $501_n$ represents detection constellation.

In one embodiment, each pattern detector $501_1$ to $501_n$ is an array of constellation level slicers to detect multi-level modulation signals. The output of the constellation level slicer is a logic zero or one if the signal is two levels or logic of multiple zero and ones if the signal is multi-level modulated. The output of each pattern detector $501_1$ to $501_n$ is a bit pattern. The input to pattern detector $501_1$ to $501_n$ is the phase rotated received constellations represented by "$I_1$" to "$I_n$" and "$Q_1$" to "$Q_n$".

In one embodiment, a bank of correlators $502_1$ to $502_n$ compares output of each pattern detectors $501_1$ to $501_n$ with the transmit pattern to find a match. When a match is detected from one or more of the pattern detectors a peak is identified by the peak detector 503. The peak detector 503 sends this information to control processor 109.

Figure 10:
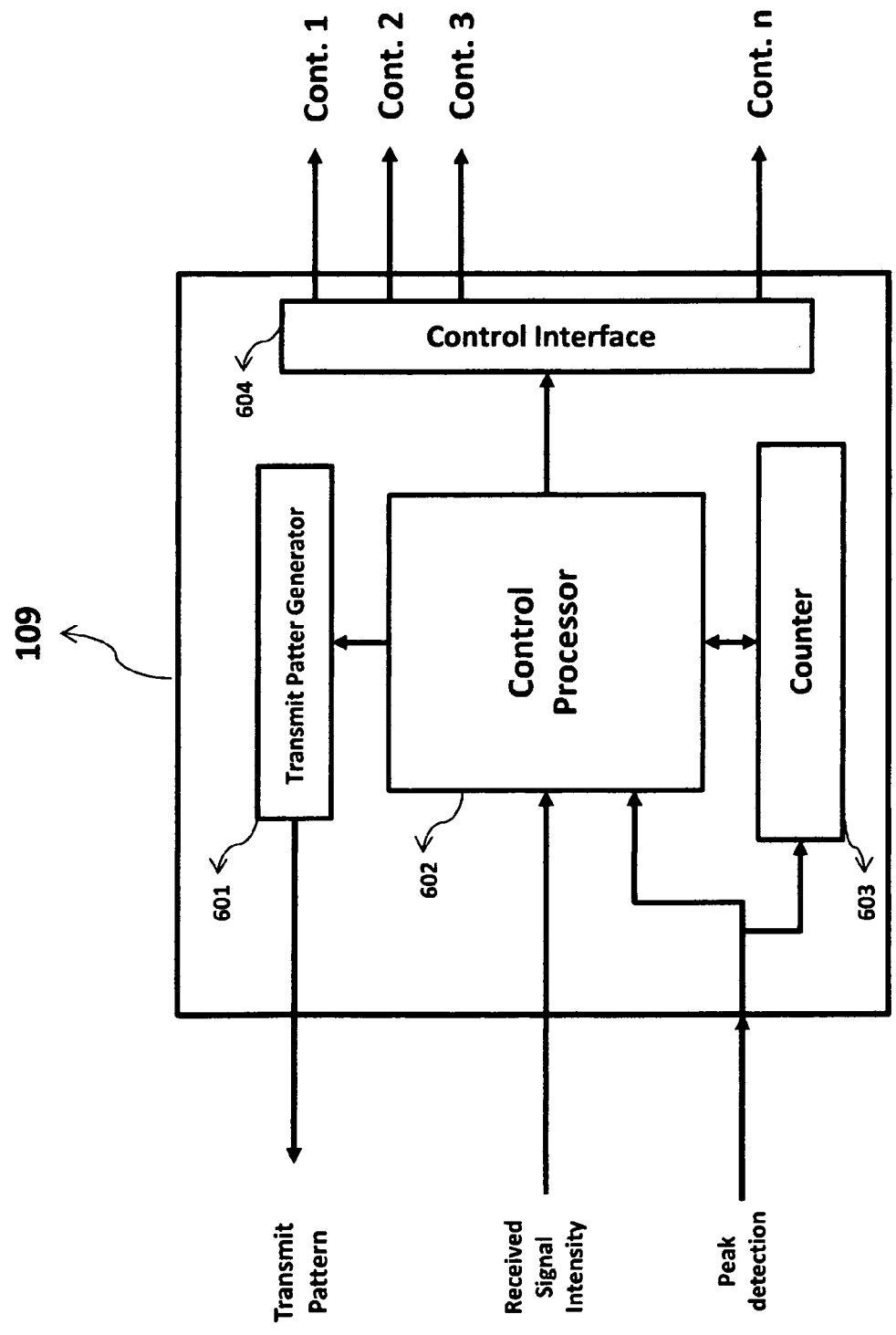
FIG. 10 illustrates embodiments of a control processor for a wireless sensor

FIG. 10 depicts an embodiment of control processor 109. In general, control processor 109 facilitates in estimating and calculating various environmental parameters. The control processor 109 comprises of a transmit pattern generator 601, a counter 603, a control interface 604 and a processor 602.

In one embodiment, the control processor 109 generates the transmit pattern through pattern generator 601 and send it to transmitter for transmission.

In one embodiment, the control processor 109 through a counter 603 controls all the timings including transmit time, time of power measurement, time of matching of transmit patterns with receive pattern.

In one embodiment, the processor 602 uses all the timing information, receive signal strength and peak detector output to estimate and calculate various environmental parameters.

In one embodiment, the processor 602 based on the estimated and calculated parameters activate various control signals to be used by peripheral devices to wireless sensor 100.

Various embodiments are thus described. While particular embodiments have been described, it should be appreciated that the embodiments should not be construed as limited by such description, but rather construed according to the following claims.

The invention claimed is:

1. A wireless sensor comprising:
a transceiver comprising:
a transmitter with configurable carrier frequency and modulation to transmit a digitally modulated predefined digital pattern signal using an analog up converter and a transmit antenna;
a receiver to receive the reflected transmit signals from various objects in wireless sensor's surrounding environment comprising:
a receive antenna to receive the reflected transmit signals and a front end to down-convert and digitize the received carrier analog signal to digital in-phase "I" and quadrature "Q" samples;
a computing device with memory to store received digitized real time "I" and "Q" samples for a configurable period of time and execute digital detection and signal strength measurement using the stored "I" and "Q" samples;
a configurable digital detector comprising:
a bank of "N" digital phase rotators using the magnitude and angle of each pair of received "I" and "Q" samples to rotate the same pair of samples by "n.θ" and to create "N" distinct pair of phase rotated "I" and "Q" samples, where n is an integer and θ is a configurable phase increment;
a bank of "N" digital level slicers to detect and store the "N" received data bits from "N" distinct stored pair of phase rotated "I" and "Q" samples;
a bank of "N" digital correlators, each using the detected bits from one of "N" level slicers to detect the predefined transmit signal pattern, and to record pattern detection times;
a processor that uses said predefined transmit signal pattern, and said pattern detection times to estimate and calculate certain environmental parameters in order to activate certain peripheral devices.

2. The wireless sensor of claim 1, wherein said wireless transceiver changes its carrier frequency and modulation to change its operating range and accuracy of the measured and calculated environment parameters.

3. The wireless sensor of claim 1, wherein said wireless transceiver has configurable transmit start time, transmit end time, receive start time and end time for storing the received digitized signal depending on the accuracy of certain environmental parameters.

4. The wireless sensor of claim 1, wherein the computing device with memory can be an application specific signal processor (ASSP), a multi-core CPU, a digital signal processor (DSP), or a field programmable gate array (FPGA).

* * * * *